(12) United States Patent
MacPherson et al.

(10) Patent No.: US 9,919,265 B2
(45) Date of Patent: Mar. 20, 2018

(54) PUMP SYSTEM FOR GAS DEHYDRATOR POWERED BY THERMAL ELECTRIC GENERATOR

(71) Applicant: KOLD KATCHER INC., Drumheller, Alberta (CA)

(72) Inventors: Duncan MacPherson, Strathmore (CA); Terry Jacobi, Red Deer (CA)

(73) Assignee: KOLD KATCHER INC., Drumheller, Alberta (CA)

( * ) Notice: Subject to any disclaimer, the term of this patent is extended or adjusted under 35 U.S.C. 154(b) by 585 days.

(21) Appl. No.: 14/458,076

(22) Filed: Aug. 12, 2014

(65) Prior Publication Data

US 2015/0044064 A1 Feb. 12, 2015

Related U.S. Application Data

(60) Provisional application No. 61/864,866, filed on Aug. 12, 2013.

(51) Int. Cl.

| | |
|---|---|
| *F04B 39/00* | (2006.01) |
| *B01D 53/26* | (2006.01) |
| *F04B 41/00* | (2006.01) |
| *F04C 11/00* | (2006.01) |

(52) U.S. Cl.
CPC .......... *B01D 53/26* (2013.01); *B01D 53/263* (2013.01); *F04B 41/00* (2013.01); *F04C 11/00* (2013.01); *Y10T 29/49238* (2015.01)

(58) Field of Classification Search
CPC ... B01D 53/26; B01D 53/263; B01D 53/1425

USPC .......... 95/231, 178, 179, 193, 209
See application file for complete search history.

(56) References Cited

U.S. PATENT DOCUMENTS

| | | | | |
|---|---|---|---|---|
| 4,431,433 A | * | 2/1984 | Gerlach | F04B 49/22 417/404 |
| 5,492,556 A | * | 2/1996 | Garrett | B01D 3/322 417/404 |
| 5,766,313 A | * | 6/1998 | Heath | B01D 53/1425 95/161 |
| 5,882,486 A | * | 3/1999 | Moore, Jr. | B01D 1/28 202/186 |
| 6,183,540 B1 | * | 2/2001 | Thonsgaard | B01D 53/1406 95/166 |
| 2005/0076942 A1 | * | 4/2005 | Hirst | G03G 15/2032 136/205 |
| 2013/0228647 A1 | * | 9/2013 | Bystry, Jr. | B64C 27/12 244/17.21 |

* cited by examiner

*Primary Examiner* — Charles Freay
(74) *Attorney, Agent, or Firm* — Heslin Rothenberg Farley & Mesiti P.C.; Victor A. Cardona, Esq.

(57) ABSTRACT

A pump system for use in a gas dehydration system having an absorber/contactor and a reboiler is used to pump glycol or another fluid through a natural gas dehydration system. The pump system includes a gear pump connected to an electric motor for pumping glycol from the reboiler to the contactor/absorber. The motor may be powered by a thermoelectric generator that uses temperature differences in the gas dehydration system fluid to convert heat into electric energy. The pump system may also include additional pumps for moving fluid from the absorber to the reboiler, for moving a second fluid through a heat trace loop, and/or for driving peripheral components.

9 Claims, 10 Drawing Sheets

PUMP SYSTEM FOR GAS DEHYDRATOR POWERED BY THERMAL ELECTRIC GENERATOR

CROSS-REFERENCE TO RELATED APPLICATIONS

This application claims priority to U.S. Provisional Patent Application No. 61/864,866 filed on Aug. 12, 2013, the entire disclosure of which is incorporated herein by reference.

FIELD OF THE INVENTION

The invention relates to an electric pump system powered by a thermal electric generator for use in a gas dehydration system.

BACKGROUND OF THE INVENTION

In the natural gas industry, recovered natural gas from a production well generally contains a large amount of water mixed in with the gas, which can create problems during recovery and processing of the gas. Specifically, the water may freeze in pipelines and equipment, and/or form hydrates with carbon dioxide and hydrocarbons, which may result in plugging equipment and pipelines. The water often contains acid gas such as hydrogen sulfide ($H_2S$) and carbon dioxide ($CO_2$), that may liquefy and drop out as the temperature or pressure of the gas decreases, thereby causing corrosion in equipment and pipelines. To prevent the aforementioned problems, natural gas is typically dehydrated to remove the water prior to the gas being introduced into pipelines. Triethylene glycol, commonly referred to as glycol, is generally used to dehydrate natural gas.

FIG. 1 illustrates a typical glycol dehydration unit 10 used in the prior art, where lean "dry" glycol 11 under high pressure is fed into a contactor or absorber column 12 where it contacts a "wet" natural gas stream 13 containing water. The dry glycol strips the water from the natural gas 13 by physical absorption in the absorber column and the now dry natural gas 15 exits the top of the absorber column and is fed into a pipeline 17. The wet glycol 19, now containing water and referred to as "rich glycol", exits the bottom of the absorber column 12 and is fed into a glycol regeneration system.

In a typical glycol regeneration system, the wet glycol 19 first enters a flash tank 21 to remove any hydrocarbon vapors (flash gas 21a) and liquids (skim oil 21b) and to reduce the pressure. Next, the wet glycol 19 is heated in a heat exchanger 16 and fed into a stripper or glycol regenerator 14. The glycol regenerator typically consists of a column 14a, an overhead condenser 14b and a reboiler 14c wherein the glycol is thermally regenerated to remove excess water (water vapor 19a) and leave hot dry glycol 11a. The hot dry glycol is cooled in the heat exchanger 16 to form cool dry glycol 11, which is pumped via a glycol pump 18 through a pressurizing system 23 to increase the glycol pressure to that of the glycol absorber 12 before being fed back into the absorber for re-use.

As is known, glycol may also be used to dehydrate other gases besides natural gas, including $CO_2$, $H_2S$ and other oxygenated gases.

One particular problem associated with glycol dehydration processes is the requirement to dehydrate natural gas at locations where grid power is not available. Often Kimray™ "energy exchange pumps" are used to pump glycol through the dehydration system and to pressurize dry glycol to the pressure of the absorber prior to introduction into the absorber. A Kimray™ pump uses high pressure gas from the reservoir to drive a piston motor to pressurize the dry glycol. However Kimray™ pumps rely on high pressures to drive the pump, and thus they often stall or run erratically when there is reduced reservoir pressure, such as 200 psig or lower. Reduced reservoir pressure may be encountered due to normal fluctuations in reservoir pressure during drilling operations, or due to a reservoir having an overall low pressure.

As a result, there is a need for an efficient and effective glycol pump that can be used to dehydrate natural gas from reservoirs having low pressure or variable pressure. There is also a need for a glycol pump that can operate in locations where grid power is not necessarily available. There is a further need for such a pump that produces limited or no greenhouse gas emissions.

SUMMARY OF THE INVENTION

In accordance with the invention, there is provided a pump system and method for pumping fluid through a gas dehydration system.

In one aspect of the invention, there is provided a pump system for operative connection to a gas dehydration system for pumping a fluid through the gas dehydration system, the gas dehydration system having an absorber for contacting the gas with the fluid to remove water from the gas and a reboiler for removing water from the fluid to regenerate the fluid, the pump system comprising a first conduit for operative connection to the absorber and to the reboiler for moving regenerated fluid from the reboiler to the absorber; a second conduit for operative connection to the absorber and to the reboiler for moving fluid from the absorber to the reboiler; a first gear pump operatively connected to the first conduit for pumping fluid through the first conduit; and an electric motor operatively connected to the first gear pump for driving the first gear pump.

In one embodiment, the first gear pump is a hydraulic gear pump.

In another embodiment, the electric motor is a variable speed motor to allow for the first gear pump to operate at various speeds.

In yet another embodiment, the pump system further comprises a power source operatively connected to the electric motor for supplying electrical energy to the electric motor. The power source may be a thermal electric generator (TEG) for converting heat from the gas dehydration system into electrical energy. Fluid from the reboiler that has been heated may flow across the TEG via a TEG conduit for providing heat to the TEG. The heated fluid may have a temperature greater than approximately 450° F. Fluid from the absorber that is cooler than the heated fluid from the reboiler may flow across the TEG for providing a temperature contrast with the heated fluid. There may be a TEG gear pump operatively connected to the electric motor for synchronous movement with the first gear pump and operatively connected to the TEG conduit for increasing the flow of the fluid across the TEG to increase energy production by the TEG. At least some of the energy generated by the TEG may be used to power one or more peripheral components.

In one embodiment, the pump system further comprises a second gear pump operatively connected to the second conduit for pumping fluid through the second conduit, the motor operatively connected to the second gear pump for driving the second gear pump synchronously with the first gear pump.

In a further embodiment, the pump system comprises a drain valve operatively connected to the second conduit for moving fluid through the second conduit from the absorber to the reboiler using the fluid pressure from the absorber. The drain valve may be a floating drain valve.

In one embodiment, the fluid in the pump system is triethylene glycol.

In another embodiment, the pump system further comprises a heat exchanger operatively connected to the first and second conduits for transferring heat to the fluid before it enters the reboiler.

In one embodiment, the pump system further comprises a third gear pump operatively connected to the electric motor for synchronous movement with the first gear pump, the third gear pump operatively connected to a heat trace system for pumping a second fluid through the heat trace system. The heat trace system may provide heat to the TEG by pumping heated second fluid across the TEG. The heat trace system may provide a temperature contrast to the heat in the TEG by pumping cooled second fluid across the TEG. The second fluid may be triethylene glycol.

In another embodiment, the gas dehydration system is a natural gas dehydration system.

In yet another embodiment, the pump system comprises a battery bank operatively connected to the TEG for storing energy generated by the TEG to provide start-up power for the pump system.

In one embodiment, the pump system comprises a driver speed controller operatively connected to the motor for controlling the speed on the motor.

In another aspect of the invention, there is provided a method for pumping fluid through a gas dehydration system having an absorber for contacting the gas with the fluid to remove water from the gas, and a reboiler for removing water from the fluid to regenerate the fluid, the method comprising the step of pumping the regenerated fluid from the reboiler to the absorber using a first gear pump that is powered by an electric motor.

The method may further comprise the steps of converting heat from the fluid in the gas dehydration system into electrical energy using a thermal electric generator (TEG) and using the energy to power the electric motor. The fluid from the reboiler that has been heated may be pumped across the TEG for providing heat to the TEG. The fluid from the absorber that has been cooled may be pumped across the TEG for providing a temperature contrast in the TEG.

In another embodiment, the method comprises the step of pumping the fluid from the absorber to the reboiler using a second gear pump driven by the electric motor.

In a further embodiment, the method comprises the step of allowing fluid to flow from the absorber to the reboiler using a floating drain valve.

In another embodiment, the method comprises the step of pumping a second fluid through a heat, trace system using a third gear pump operatively connected to the electric motor.

In another aspect of the invention, there is provided a method for retrofitting an existing gas dehydration system having a fluid pump wherein the pump system described is connected in parallel to the fluid pump in the existing gas dehydration system.

BRIEF DESCRIPTION OF THE DRAWINGS

The invention is described with reference to the accompanying figures in which.

DETAILED DESCRIPTION OF THE INVENTION

Figure 1:
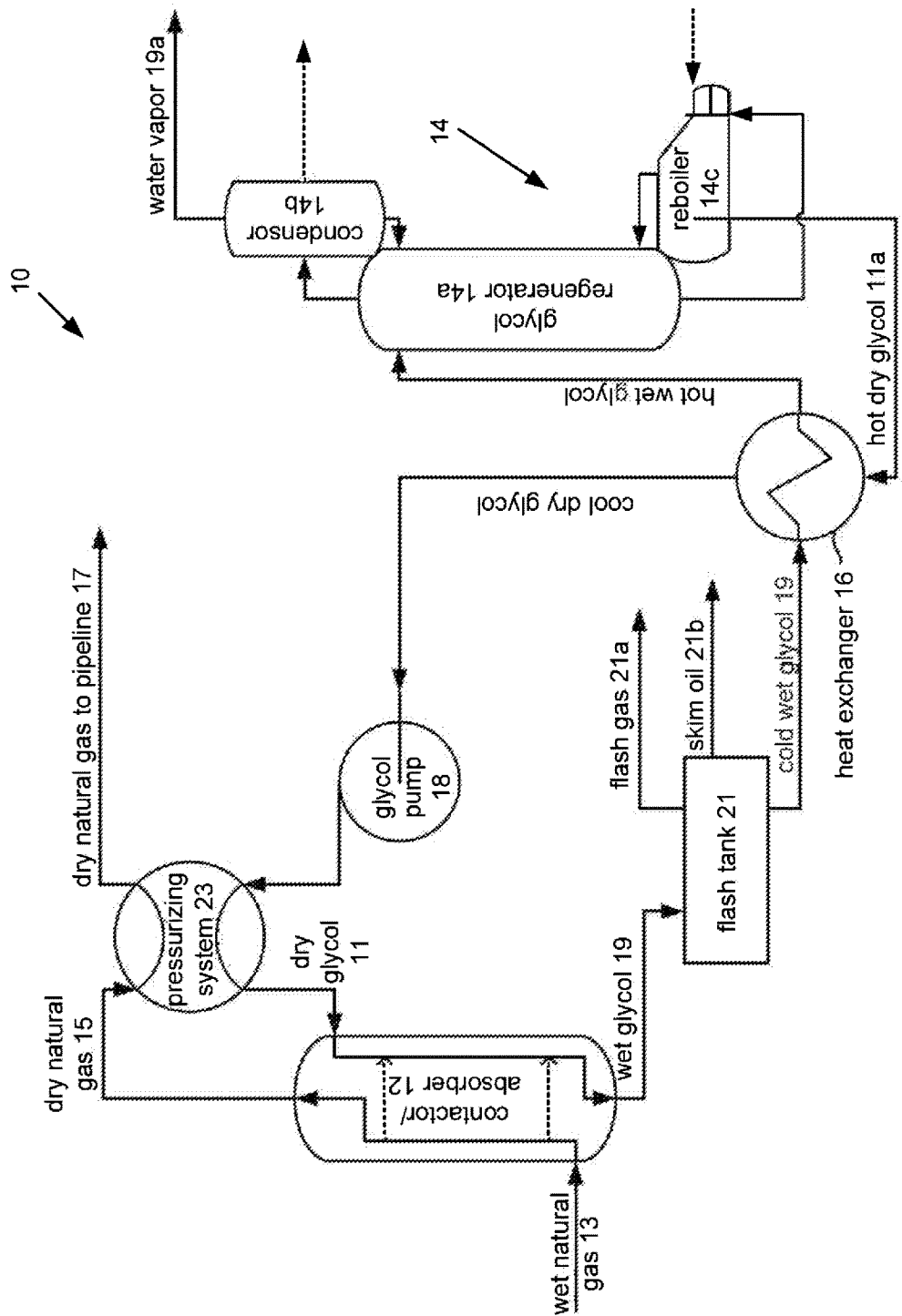
FIG. 1 is a flow diagram of a natural gas glycol dehydration system in accordance with the prior art.
Figure 2:
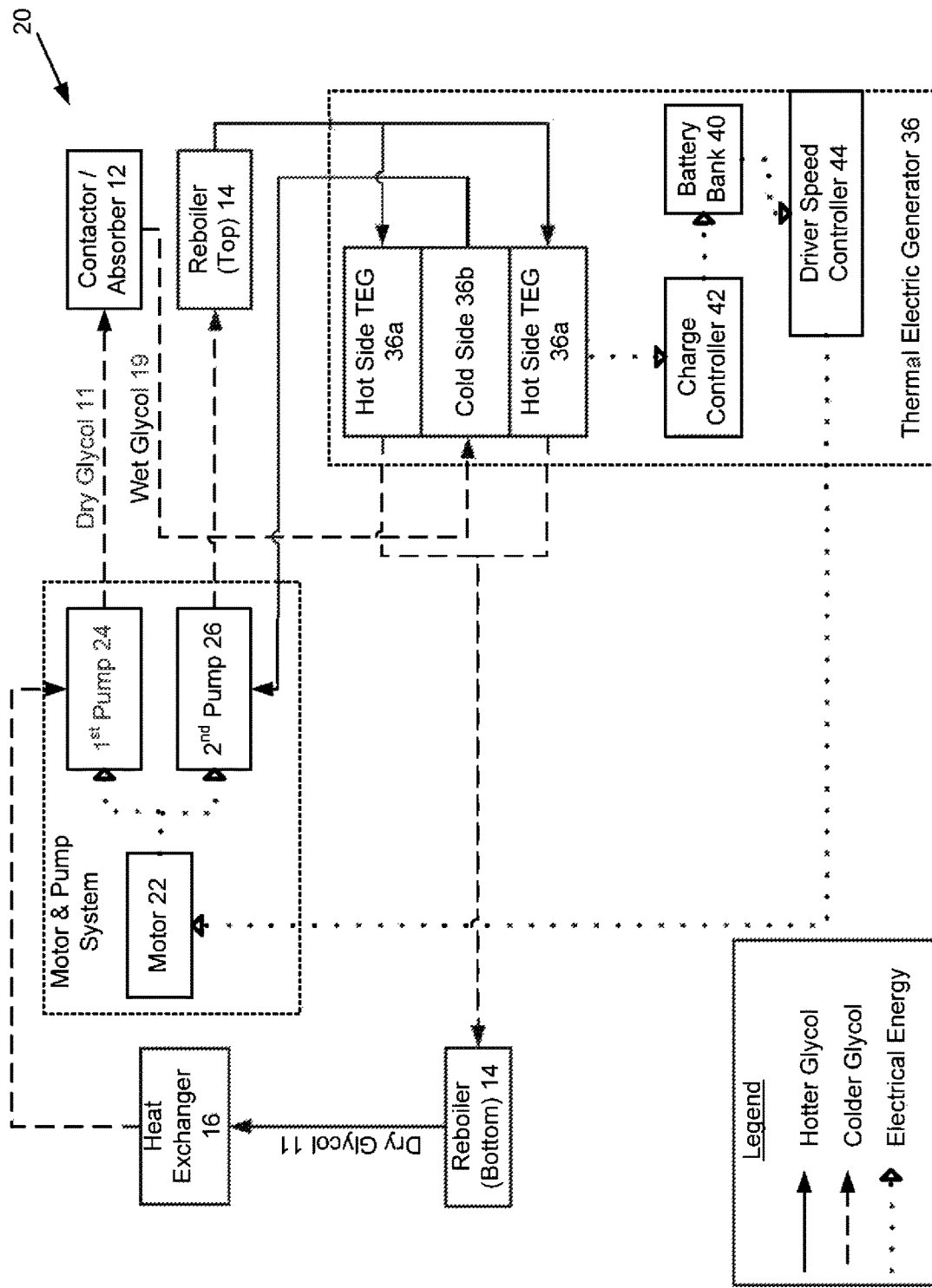
FIG. 2 is a flow diagram of a pump system for a gas dehydration system in accordance with one embodiment of the invention.

With reference to the figures a pump system 20 for use in a gas dehydration system 10 is described. Referring to FIG. 2, the pump system 20 generally comprises a motor 22, a first pump 24, a second, pump 26, a thermal electric generator 36 and a battery bank 40. The pump system 20 is plumbed into a typical gas dehydration system 10, such as the one shown in FIG. 1 and described in the background of the invention, which generally includes the absorber 12, reboiler 14, heat exchanger 16 and glycol pump 18.

In one embodiment, the motor 22 of the pump system 20 drives the first and second pumps 24, 26. Preferably, the motor is an electric motor connected to a belt drive for synchronously driving the first and second pumps 24, 26 using a belt and pulley system or other means (not shown). In one embodiment, the pumps are hydraulic gear pumps and the motor is a variable speed motor, such as a 24 volt DC electric motor. The speed of the motor is controlled automatically or manually with the necessary controls. In one embodiment, an electronic driver speed controller 44 connected to the motor. The motor speed may vary from approximately 0 to 600 rpm in a typical system, however other speed ranges may be used as needed. In addition to driving the pumps, the motor may also be configured to drive other components of the gas dehydration system, such as an air compressor or a gas compressor.

The thermal electric generator (TEG) 36 converts heat generated by the gas dehydration system into electrical energy for powering the electric motor. Preferably, the TEG generates at least 86 watts of power; however the TEG may be configured to generate more or less power based on the demands on the pump system. Electrical energy from the TEG may be stored in the battery bank 40 that is connected to the TEG and the motor to provide start-up power for the system. After the system has been started and sufficient heating and cooling is achieved, the system is self-sufficient in power consumption and the battery bank remains fully charged. In the preferred embodiment, the battery bank includes two 12V batteries 40a (see FIG. 7) and a charge controller 42 for controlling the battery charge. The charge controller may be a 12/24 volt equalizer that balances the voltage between the two 12V batteries and prevents, the batteries' performance, reliability and lifespan from being compromised.

The first and second pumps 24, 26 move fluid through the gas dehydrator. Preferably the pumps are variable speed in order to accommodate various fluid volumes and pressures. The fluid will be described as glycol, however other heat transfer fluids may be used in the system. Referring to FIG. 2, the first pump 24 pumps dry glycol 11 from the reboiler 14 through the heat exchanger 16 and into the absorber 12. The first pump 24 may also pressurize the dry glycol to reach the pressure of the absorber, which is typically between 50 Psi and 1000 Psi, prior to injection into the absorber. Preferably, the first pump is a positive displacement pump to pressurize the glycol. Prior to pressurization, the typical pressure of the glycol is between 0 Psi and 20 Psi. The second pump 26 moves the wet glycol 19 from the absorber 12 into the reboiler 14 where the water is stripped from the wet glycol. Each of the pumps may include additional components such as flow meters for measuring the flow rate of the fluid.

In one embodiment, the second pump includes a let down valve to accommodate the drop in pressure as fluid flows from the absorber to the reboiler. The first pump may include a valve that is controlled by fluid velocity, such that if the fluid velocity reaches a threshold, the valve closes to prevent flow through the pump. This is important for safety reasons. For example, if there is a break in a line or a runaway pump due to a broken drive belt or other defect, causing fluid flow to increase, the pump will shut off fluid flow to the reboiler to prevent the release of gas emissions through the reboiler.

The speed of the pumps may be varied according to the conditions in the system. For example, if the rate of gas flow through the absorber is low, the pump speed would be kept at a minimum in order to minimize the flow of glycol through the system. If the rate of gas flow through the absorber is high, the pump speed would be increased in order to achieve the optimum dehydration of the gas in the absorber.

The temperature difference in the glycol fluids is used to convert heat to electrical energy in the TEG 36. As shown in FIG. 2, the hotter fluid exiting the reboiler, shown by the solid line, flows through one or more hot sides 36a of the TEG prior to re-entering the reboiler 14. Preferably, the temperature of the hotter fluid entering the TEG is 350° F. to 390° F. (175° C. to 200° C.). The colder fluid exiting the absorber 12, shown by the dashed line, flows through one or more cold sides 36b of the TEG prior to entering the reboiler. Preferably, the colder fluid is 40° F. to 90° F. (4° C. to 32° C.) Alternatively, the cold side of the TEG may be supplied with colder fluid from another source, such as a secondary fluid loop, as described in more detail below, or by using cool air from the atmosphere.

FIG. 2 shows the TEG is shown as having two hot sides 36a with a cold side 36 sandwiched between the hot sides, wherein the hotter and colder fluids flow countercurrently through the TEG. The countercurrent flow allows for the largest temperature difference between the hot and cold sides to be maintained across the entire TEG, which increases the conversion of heat into electricity and increases the effectiveness and efficiency of the TEG. However, other set-ups for the TEG may be used, such as having only one hot side and one cold side, and/or having concurrent flow.

Figure 3:
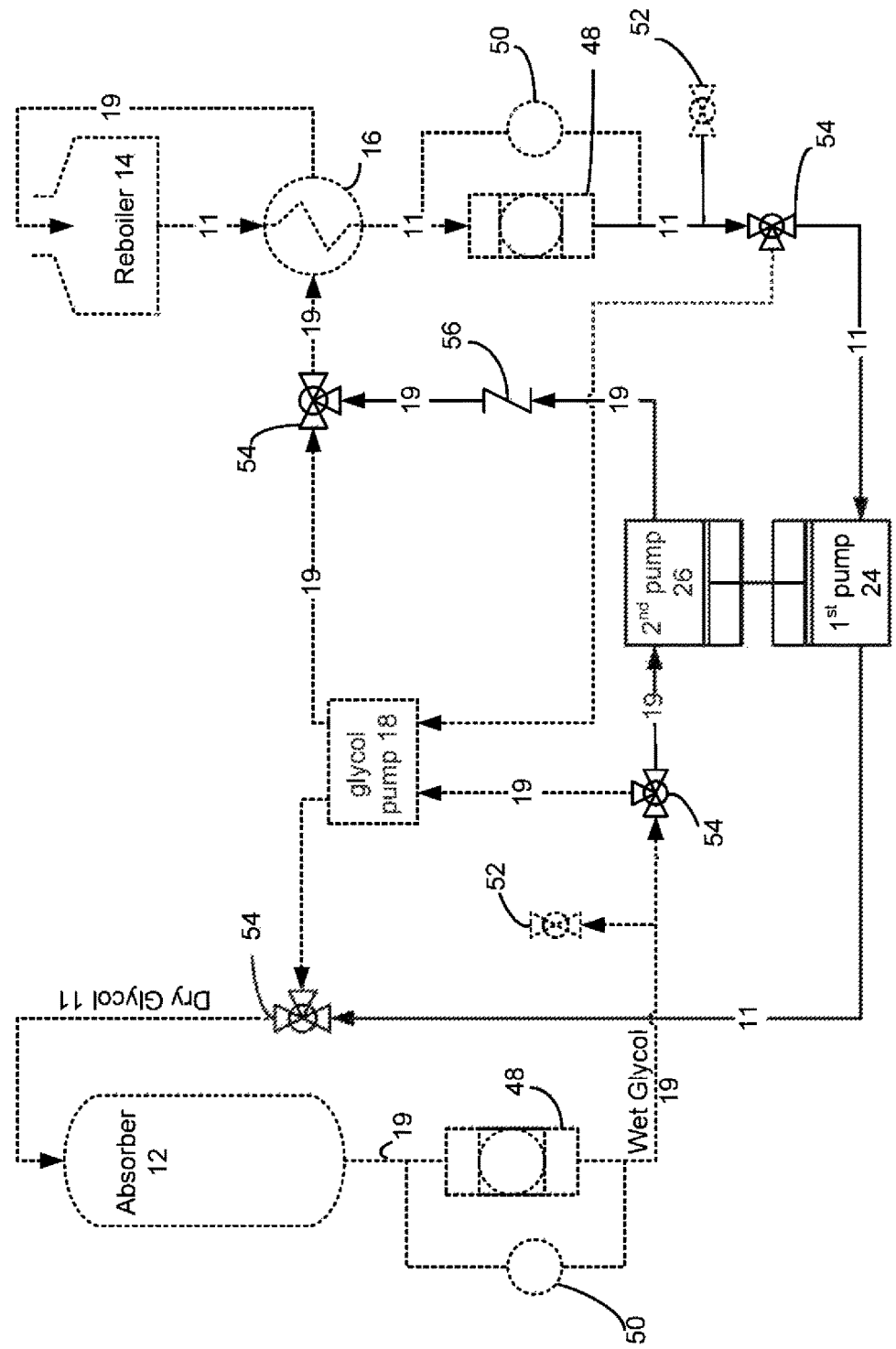
FIG. 3 is a schematic diagram showing a pump system plumbed into an existing gas dehydration system with an existing glycol pump in accordance with one embodiment of the invention.

FIG. 3 illustrates how the pump system 20 can be plumbed into one example of an existing gas dehydration unit 10 that already has a glycol pump 18. FIG. 3 also shows the flow of dry glycol 11 and wet glycol 19 through the pump system 20 and existing gas dehydration unit 10. The dashed lines in FIG. 3 illustrate the existing devices and plumbing, while the solid lines illustrate the pump system 20 of the present invention that is plumbed in. In addition to the absorber 12, reboiler 14, heat exchanger 16 and glycol pump 18, the existing gas dehydration unit 10 may include particulate filters 48, differential pressure gauges 50, and bleed valves 52. Only major equipment and plumbing lines are shown, and other parts such as unions, check valves, relief valves, etc., as would be known to one skilled in the art, are not illustrated.

To plumb in the pump system 20, the first and second pumps 24, 26 are connected in opposite directions of flow between the reboiler 14 and the absorber 12, and are connected in parallel to the glycol pump 18 using three-way valves 54. Alternatively, a pair of valves could be used instead of three-way valves. By connecting the first and second pumps in parallel to the existing glycol pump, an operator can choose to use either the first and second pumps or the existing glycol pump, or all the pumps can be used simultaneously. This allows versatility and flexibility in the pump system depending on the pumping conditions. This also allows an operator to easily retro-fit an existing gas dehydration system without having to remove components from the existing system.

Figure 5:
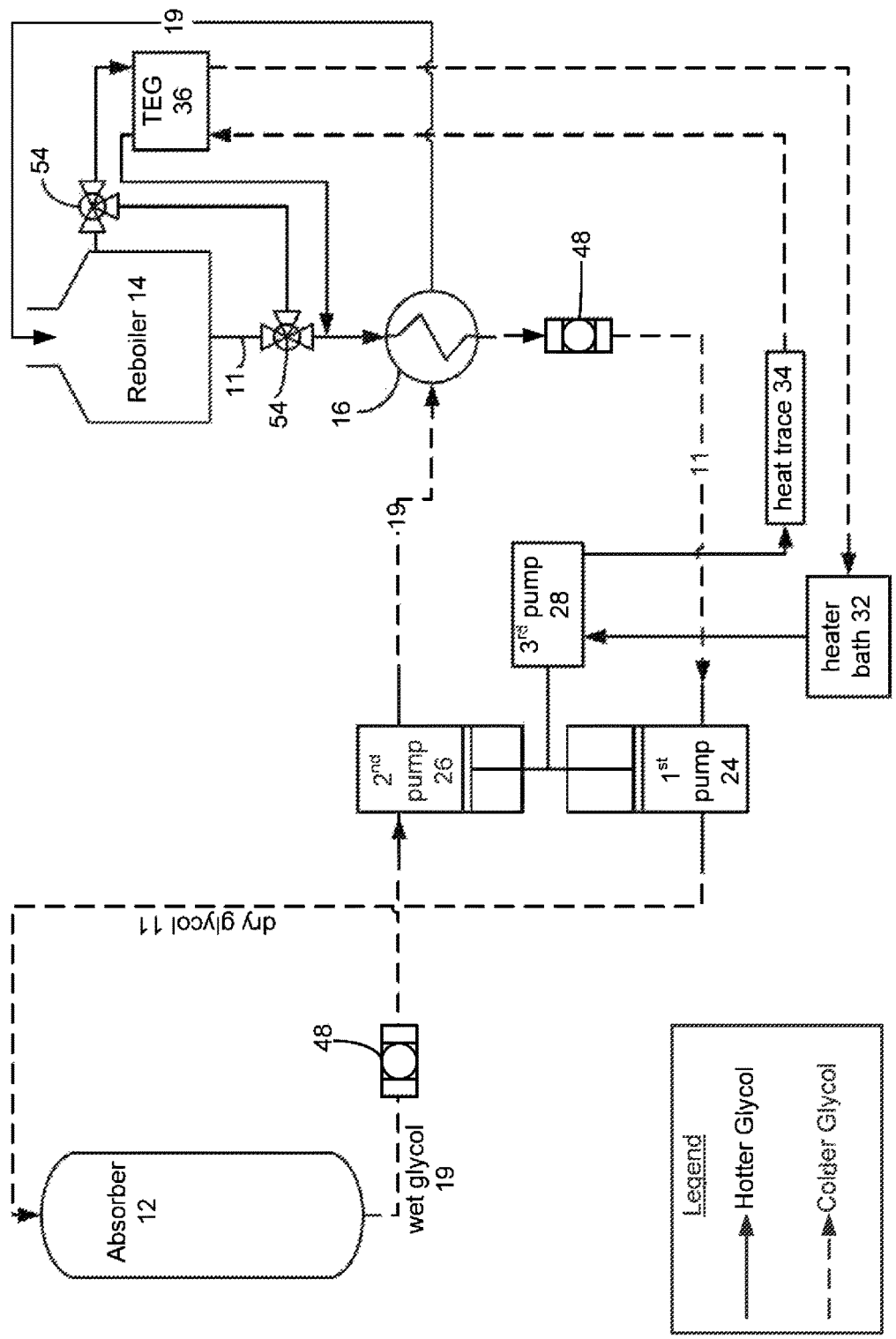
FIG. 5 is a schematic diagram showing a pump system having three pumps plumbed into a gas dehydration system in accordance with one embodiment of the invention.

In another embodiment, the pump system 20 is connected to a gas dehydration unit in place of the usual glycol pump, wherein the pump system 20 acts as the sole pump system for the unit FIG. 5 illustrates a gas dehydration unit having the pump system 20 as the sole pump system. While FIG. 5 shows the pump system 20 having three pumps 24, 26, 28, two pumps would be sufficient and the third pump is not necessary, however the third pump is used in another embodiment of the invention as described in further detail below.

Figure 4:
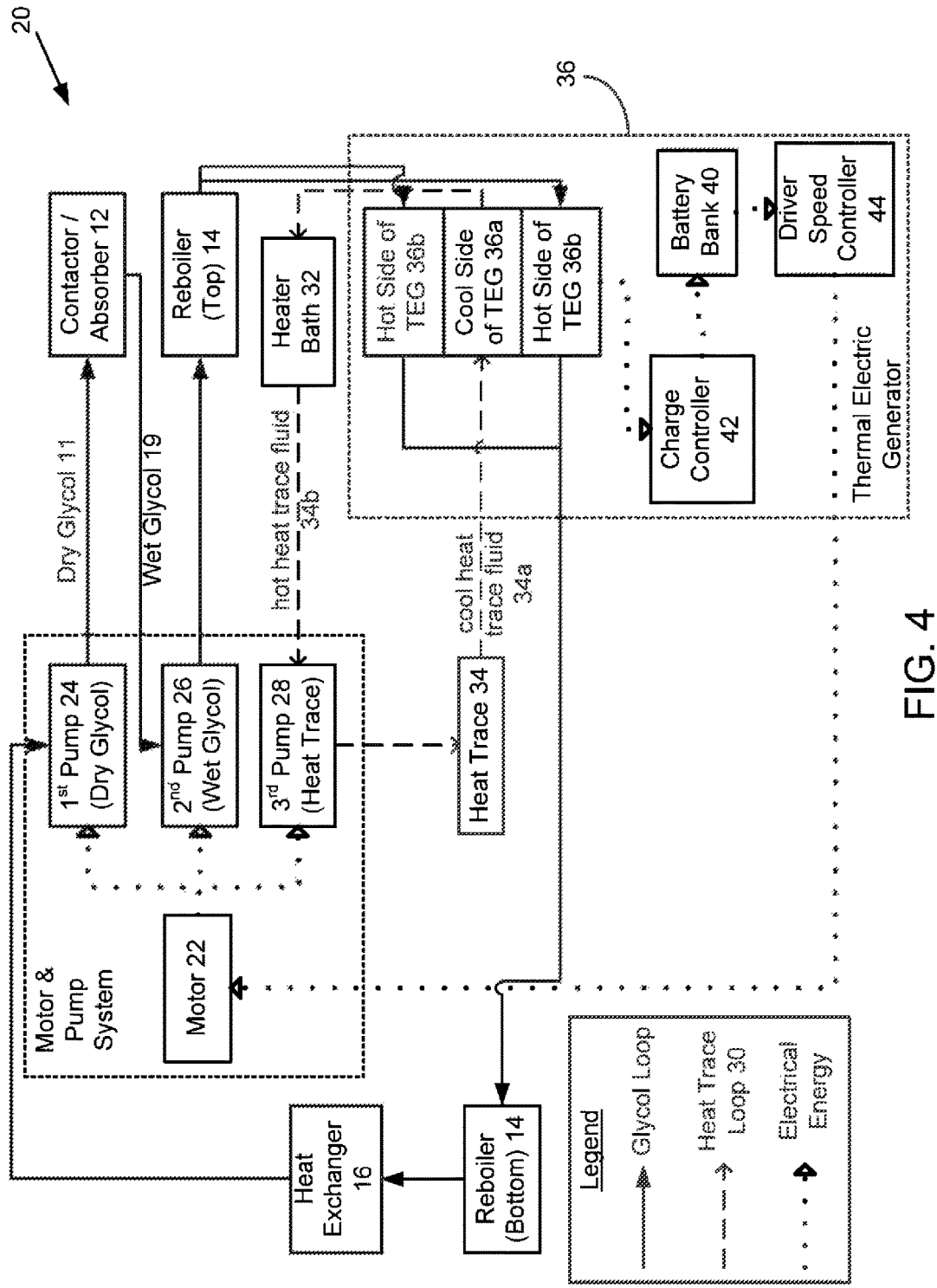
FIG. 4 is a flow diagram of a pump system with a third pump and heat trace loop for a gas dehydration, system in accordance with one embodiment of the invention.
Figure 7:
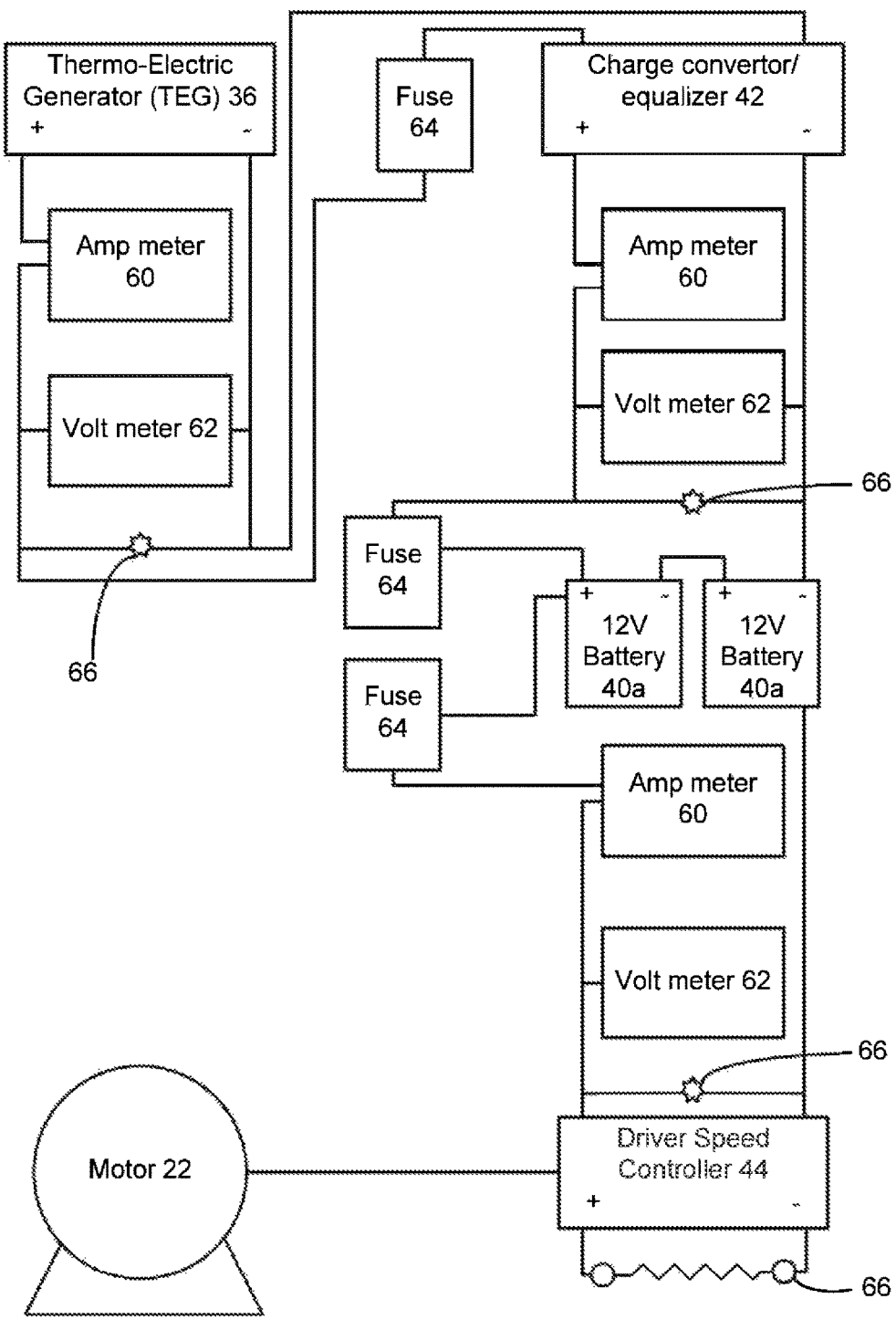
FIG. 7 is an electrical diagram of a pump system in accordance with one embodiment of the invention.

FIGS. 2 and 4 illustrate the flow of electricity through the system, shown by the dotted lines, between the TEG 36 and the motor and pump system. FIG. 7 provides more detail on the electrical schematic of the system and illustrates the position of electrical components such as amp meters 60, volt meters 62, fuses 64, potentiometer 66, and LED indicators 68.

Alternate Embodiments

In an alternate embodiment of the invention shown in FIG. 4, a third pump 28 is used to move fluid through a separate loop, which in this case is a heat trace loop 30. The third pump 28 is connected to the motor 22 via the same belt and pulley system as the first and second pumps 24, 26, such that the third pump is driven synchronously with the first and second pumps. In the heat trace loop 30, shown by the dashed line in FIG. 4, a hot heat trace fluid 34b is pumped through a heat trace 34 that flows parallel to or across pipes and vessels (not shown) in the system or peripheral to the system to transfer heat from the hot fluid 34b in order to maintain or raise the temperature of the pipes/vessels. After heat has been transferred from the hot heat trace fluid 34b to form a cool heat trace fluid 34a, the cool fluid 34a is passed through a heater bath 32 or other suitable heating device for raising the temperature of the heat trace loop fluid. The heat trace fluid may be glycol or another suitable heat transfer fluid.

The fluid in the heat trace loop may be used to provide a temperature contrast in the TEG. In one embodiment shown in FIG. 4, the cool heat trace fluid 34a flows through the cool side 36a of the TEG to provide a temperature contrast to the hot glycol that flows through the hot side 36b of the TEG.

FIG. 5 illustrates how the pump system having three pumps and a heat trace loop may be connected to a gas dehydration system. FIG. 5 also shows the temperature differences between the glycol fluid, wherein the hotter glycol is shown with a solid line and the colder glycol is shown with a dashed line.

Figure 6:
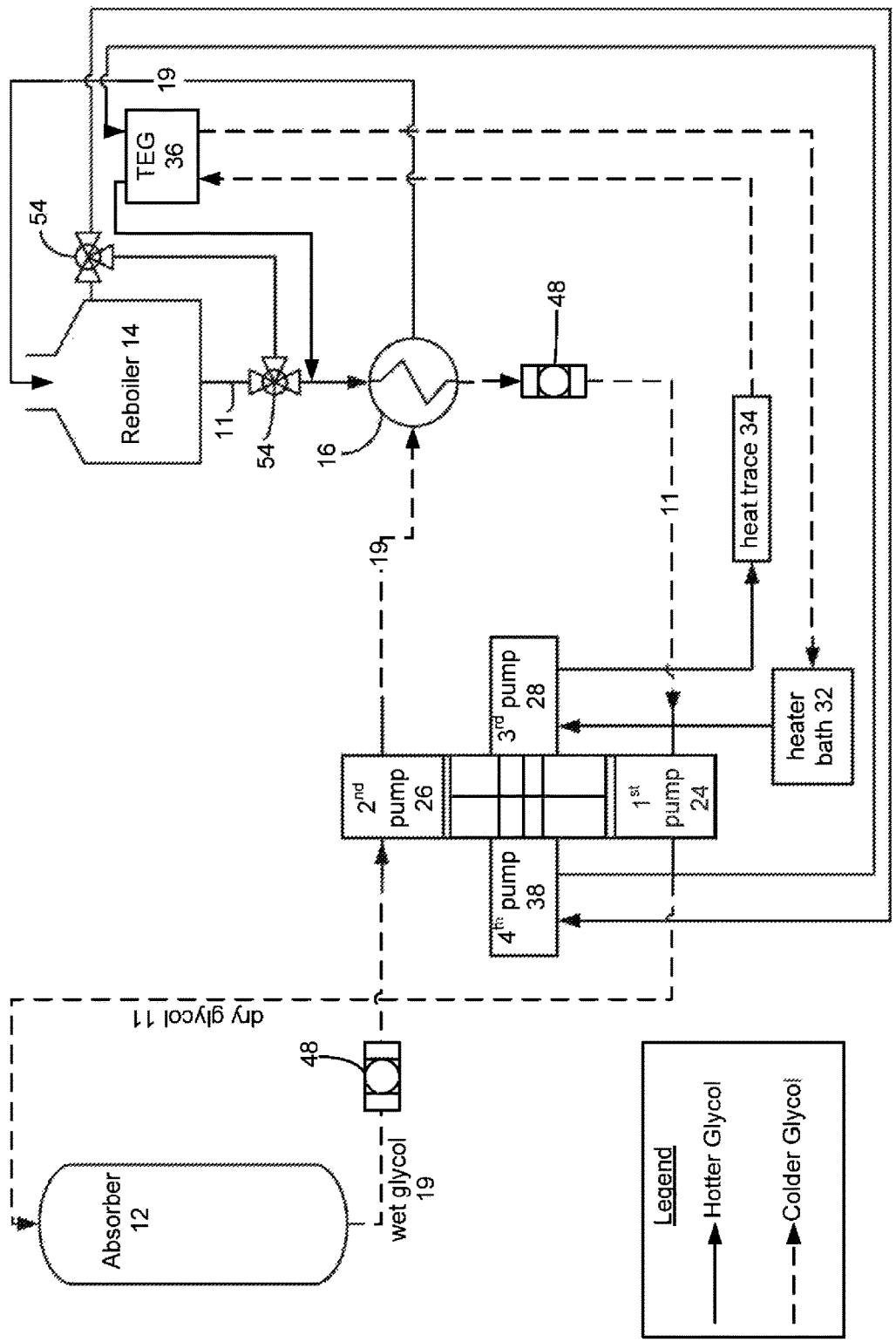
FIG. 6 is a schematic diagram showing a pump system having four pumps plumbed into a gas dehydration system in accordance with one embodiment of the invention.

A further embodiment, shown in FIG. 6, uses a fourth pump 38 to increase hot glycol flow across the TEG to facilitate increased electricity production to operate peripheral components such as lights, industrial control systems like SCADA (supervisory control and data acquisition), and other components that would be known to one skilled in the art. Preferably, the fourth pump 38 pumps very hot glycol having a temperature of approximately 450° F. to 550° F. (230° C. to 290° C.), and preferably 500° F. (260° C.) through the hot side of the TEG. Upon exiting the TEG, the glycol flows into the heater bath 32 for heating prior to being pumped through the heat trace 34 by the third pump 28.

Figure 8:
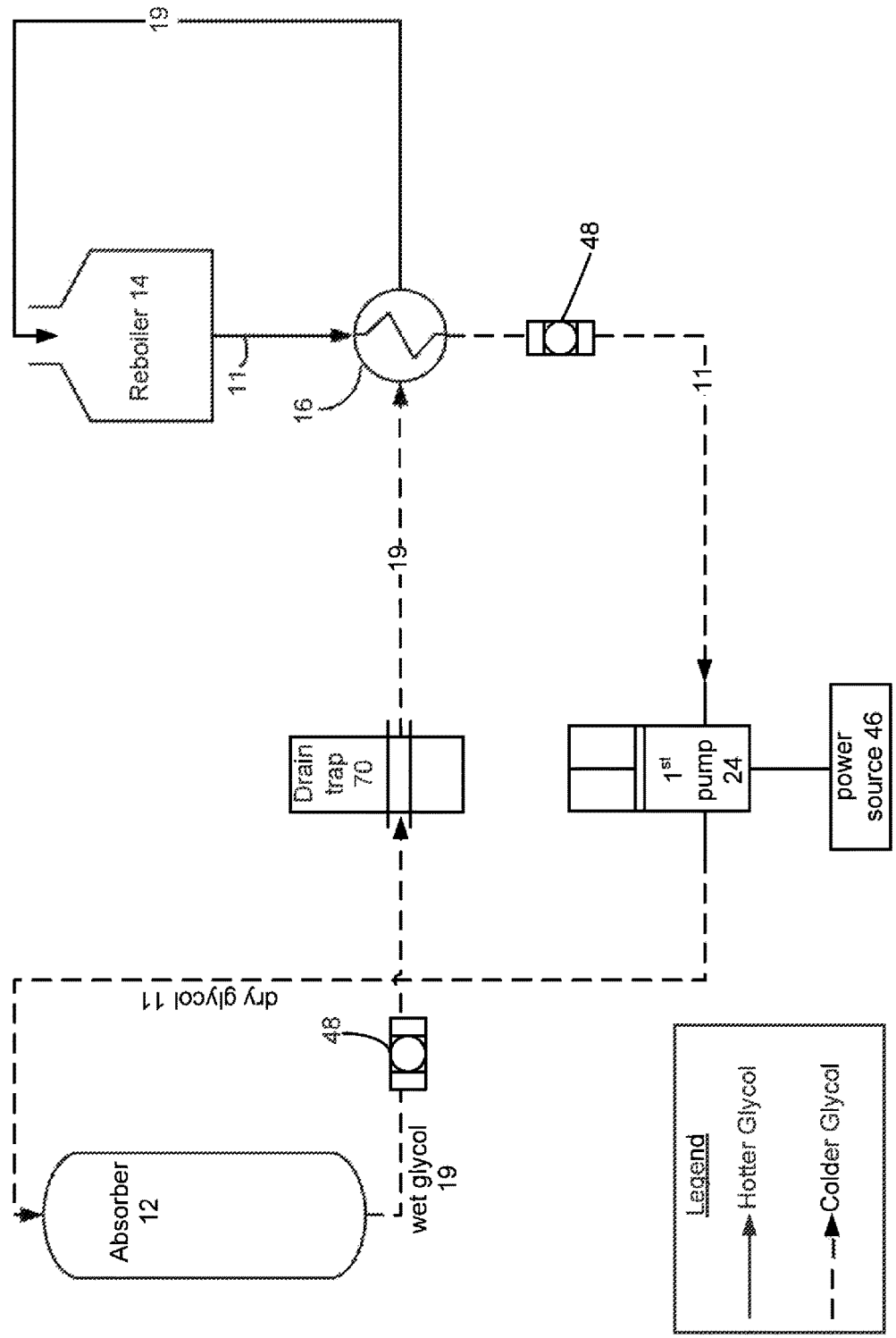
FIG. 8 is a schematic diagram showing a pump system having a first pump and a drain valve plumbed into a gas dehydration system in accordance with one embodiment of the invention.
Figure 9:
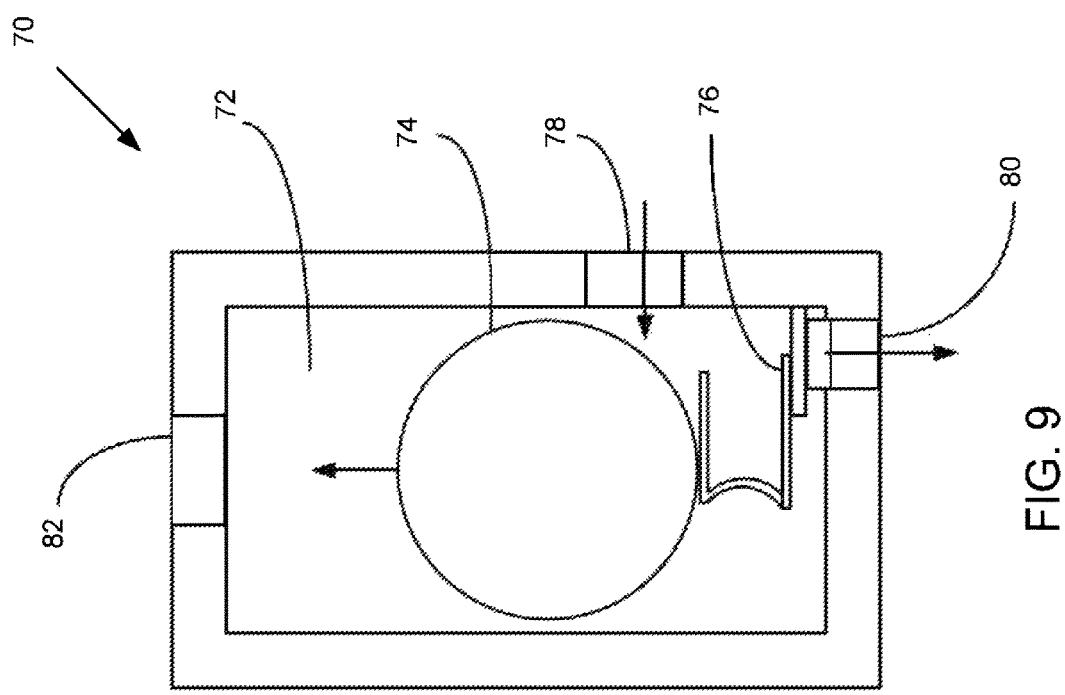
FIG. 9 is a cross-sectional side view of a floating lever drain valve for use in the pump system in accordance with one embodiment of the invention.

In yet another embodiment, shown in FIG. 8, the second pump 26 is replaced with a drain trap or valve 70 designed to handle high pressure fluids and large loads. An example of such a drain trap is illustrated in FIG. 9 As fluid flows into in inner cavity 72 of the drain trap through inlet 78 and accumulates, a float 74 moves upwardly. Upon reaching a threshold level of fluid, the position of the float opens a valve 76 and the fluid flows out from the inner cavity through a drain 80. A vent 82 may be located above the inlet to allow gases to vent from the inner cavity. The drain trap allows liquid glycol to flow from the absorber 12 to the reboiler 14 automatically and under the pressure of the absorber, without requiring an active pump, thereby decreasing emissions. Furthermore, the drain trap/valve allows only liquid to flow through the valve, unlike a let down valve in a pump which allows both liquids and gases to flow through. Preferably, the drain trap is a free floating lever drain trap, however other drain traps could be used, such as a fixed pivot ball drain trap or the like. An example of a suitable drain trap is the Armstrong 33-LD™ which is designed to handle loads up to 42,000 lb/hr (19,050 kg/hr) and pressures up to 1000 psig (69 bar).

Figure 10:
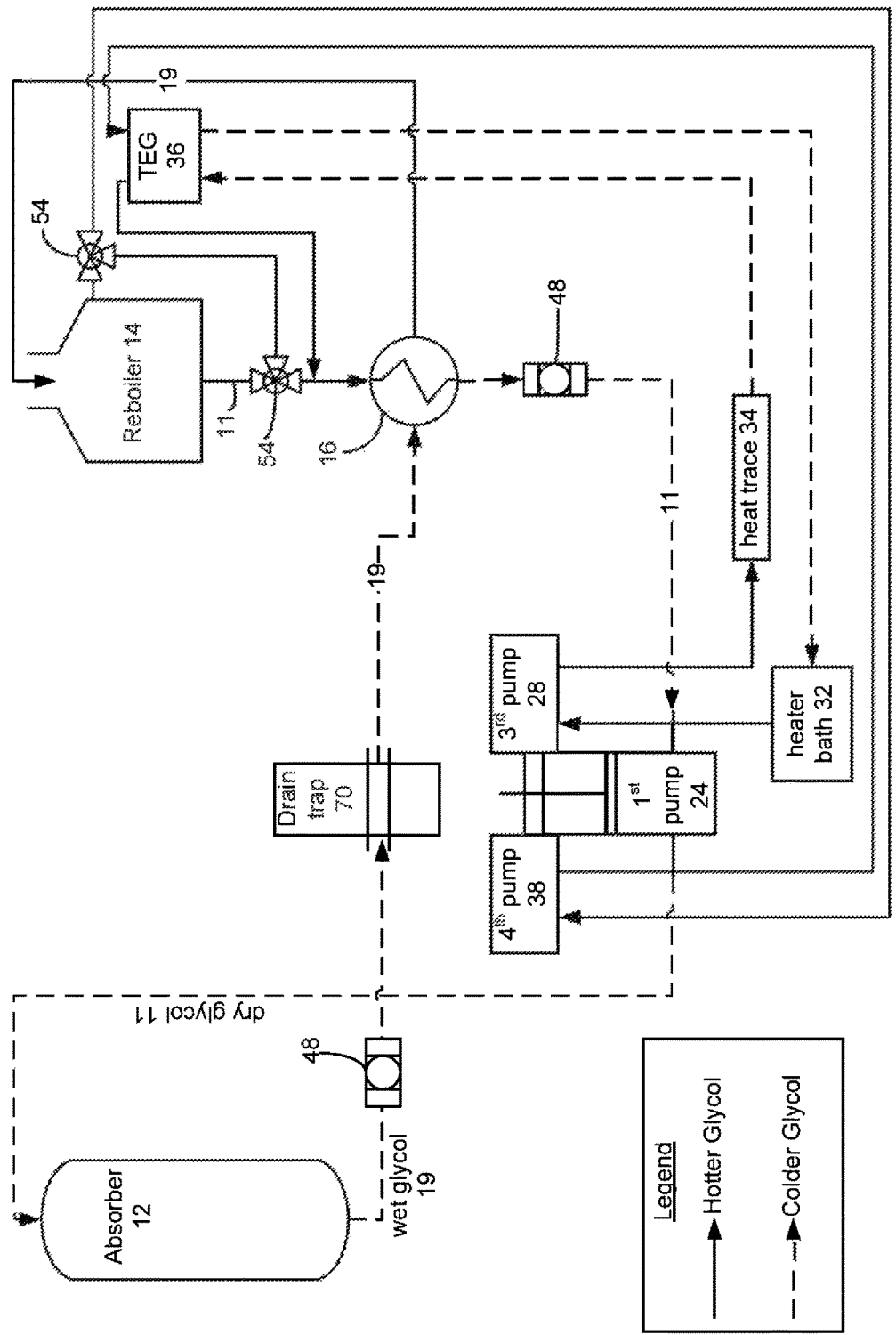
FIG. 10 is a schematic diagram showing a pump system having three pumps and a drain valve plumbed into a gas dehydration system in accordance with one embodiment of the invention.

In another embodiment, shown in FIG. 10, the second pump 26 is again replaced with a drain trap or valve 70 to move fluid from the absorber 12 to the reboiler 14. In this embodiment there is still a TEG 36, and multiple pumps 24, 28, 38 are still used to increase electricity production and operate additional components such as a heat trace loop. Again, any number of pumps can be used.

In other embodiments, the TEG generates enough power to operate further pumps and components that are used to virtually eliminate greenhouse gas emissions associated with gas dehydration. For example, the system may supply power to a gas compressor and to a separate pump for pumping wet glycol from a flash tank to the reboiler. In this embodiment, flash gas removed from the flash tank is recycled into the gas inlet of the absorber. This process removes virtually all the gas entrained in the wet glycol prior to the wet glycol entering the reboiler, thereby drastically reducing and/or virtually eliminating hydrocarbon emissions venting from the reboiler during glycol regeneration.

Various modifications can be made to the configuration of the pump system that are within the scope of the invention and would be known to a person skilled in the art. While the description and figures illustrate certain configurations and components for an existing system, such as a gas dehydration unit, that the pump system could be plumbed into, a person skilled in the art would understand the pump system could be connected to and used in various other systems as well.

While the pump system has been described as being powered by a TEG, other methods and systems for providing power to the pump system may be used alone or in conjunction with the TEG. Specifically, the pump system may run on grid power or renewable energy sources such as wind and/or solar power. However, using a TEG that utilizes heat already present in the gas dehydration system allows for a pump system that does not produce greenhouse gases and that can be used in remote locations wherein grid power is unavailable or prohibitively expensive. FIG. 8 illustrates an embodiment where the pump system is connected to an alternate power source 46.

The pump system has been described as being used in a gas dehydrator; however the system may be used in other applications, such as an $H_2S$ scrubbing system using amines.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. A pump system in operative communication with a gas dehydration system which converts a wet fluid to a dry fluid, the gas dehydration system having an absorber for contacting a gas with a wet fluid to remove water from the gas, and a reboiler for removing water from the wet fluid to provide the dry fluid, the pump system comprising:
    a first hydraulic gear pump configured to circulate the dry fluid from the reboiler to the absorber and a second hydraulic gear pump to circulate the wet fluid from the absorber to the reboiler;
    an electric motor for driving the first hydraulic gear pump and the second hydraulic gear pump; and
    a thermal electric generator (TEG) operatively connected to the electric motor for supplying electric energy to the electric motor, wherein the dry fluid from the reboiler flows across the TEG via a TEG conduit for providing heat to the TEG.

2. The pump system of claim 1 wherein the electric motor is a variable speed motor to allow for the first hydraulic gear pump and the second hydraulic gear pump to operate at various speeds.

3. The pump system of claim 1 wherein fluid from the absorber that is cooler than the dry fluid from the reboiler flows across the TEG for providing a temperature contrast with the heated fluid.

4. The pump system of claim 1 wherein the heated dry fluid from the reboiler has a temperature greater than approximately 450° F.

5. The pump system of claim 1 wherein at least some of the energy generated by the TEG is used to power one or more peripheral components.

6. The pump system of claim 1 wherein the fluid is triethylene glycol.

7. The pump system of claim 1 wherein the gas dehydration system is a natural gas dehydration system.

8. The pump system of claim 1 further comprising a battery bank operatively connected to the TEG for storing energy generated by the TEG to provide start-up power for the pump system.

9. The pump system of claim 1 further comprising a driver speed controller operatively connected to the motor for controlling the speed on the motor.

* * * * *